Patented Sept. 21, 1937

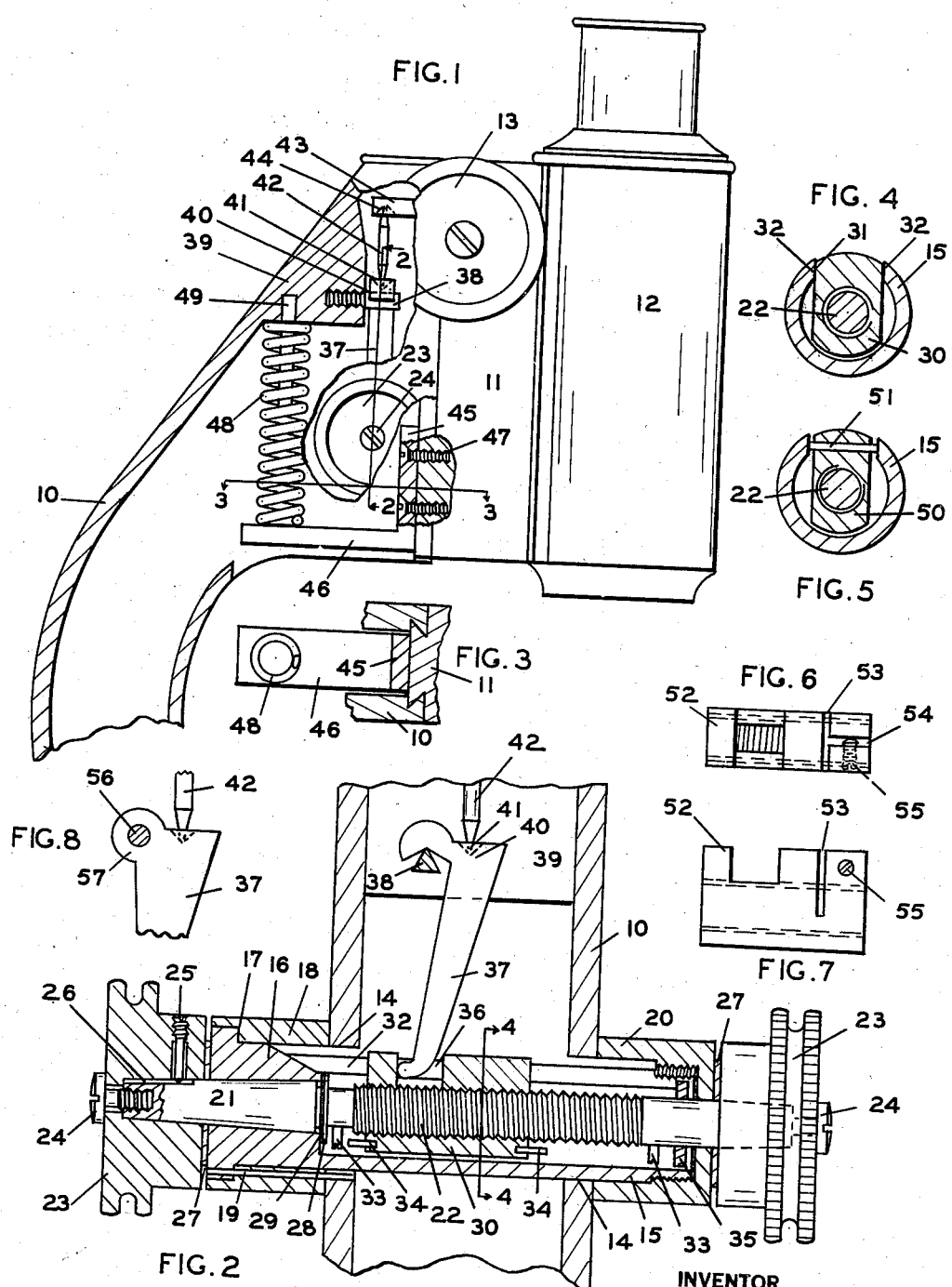

2,093,611

UNITED STATES PATENT OFFICE 2,093,611

MICROSCOPE

Henry F. Kurtz, Rochester, N. Y., assignor to Bausch & Lomb Optical Company, Rochester, N. Y., a corporation of New York Application September 29, 1934, Serial No. 746,235

8 Claims. (Cl. 88—39)

The present invention relates to microscopes and more particularly to mechanisms for effecting a fine adjustment for focusing the instrument.

One of the objects of this invention is to provide a fine adjustment mechanism for a microscope which will be compact and simple of structure yet efficient in operation. Another object of my invention is to provide a fine adjustment mechanism which can be assembled and fitted as a unit and then readily inserted into the arm of the instrument. These and other objects and advantages reside in certain novel features of construction, arrangement and combination of parts as will hereinafter be more fully described and pointed out in the appended claims.

Figure 1 is a side elevation of a microscope embodying my invention having parts broken away.

Fig. 2 is an enlarged fragmentary section taken on line 2—2 of Fig. 1.

Fig. 3 is a fragmentary section taken on line 3—3 of Fig. 1.

Fig. 4 is a section taken on line 4—4 of Fig. 2.

Fig. 5 is a sectional view similar to Fig. 4, of a modified block and guide.

Fig. 6 is a top plan view of another modified form of block.

Fig. 7 is a side elevation of the block shown in Fig. 6.

Fig. 8 is a fragmentary view of a modified form of pivot.

One preferred form of my invention is shown in the drawing wherein 10 designates a microscope arm on which is mounted a slide 11 carrying a body tube 12. The usual knob 13 is provided to effect the coarse adjustment of the tube for focusing as is well known to those skilled in the art.

For the fine adjustment, the hollow arm 10 is provided with two aligned apertures 14 through which extends a cylindrical tube 15 which is formed at one end as a tapered bearing member 16 having a shoulder 17. A cylindrical collar 18 surrounds the tube 15 and abuts the shoulder 17 and the arm 10 to limit the insertion of said tube 15. A pin 19 extends through the shoulder 17 and the collar 18 and into the arm 10 for properly positioning the tube 15 and for preventing rotation thereof. The other end of the tube 15 extends through the arm 10 and has a collar 20 threaded thereon which abuts the arm 10 and serves to clamp the tube 15 securely to the arm 10.

A shaft 21, threaded at 22, extends longitudinally through the tube 15 and is journaled in the tapered bearing 16 and in the collar 20. A knurled knob 23 is fastened to each end of the shaft 21 by a screw 24 and a set screw 25 in each knob extends into a keyway 26 in the shaft to prevent relative rotation between the shaft and the knob. A washer 27 is located between each knob 23 and the adjacent member. The shaft 21 is formed with a limiting shoulder 28 adjacent the tapered bearing 16 and a washer 29 is located between this shoulder and the bearing.

Threaded on the portion 22 of the shaft 21 within the tube 15 is a block 30 which has plane parallel sides 31 engaging the plane parallel walls 32 of a slot in the tube 15. Thus rotation of the shaft 21 will cause sliding movement of the block 30 longitudinally of the tube 15. Adjacent the ends of the threaded portion 22, the shaft 21 is provided with lugs 33 which engage the extensions 34 on the block 30 to stop rotation of the shaft 21 without injury to the threaded portion 22. A bracing member 35 is located adjacent the open end of the tube 15 and extends into the slot fitting snugly therein to prevent the collapsing of the open end of the tube 15 by the collar 20.

The sliding block 30 has a notch 36 into which extends an arm 37 of a lever pivoted on a knife edge 38 which is fastened to a projection 39 on the inside of the hollow arm 10. The other arm 40 of lever 37 has a recess 41 for receiving a pin 42 upon which rests the extension 43 fixed to the slide 11 and having a notch 44 for receiving the pin 42.

A bracket 45 having a horizontal extension 46 is fastened to the lower end of the slide 11 by screws 47 and a compression spring 48 having a guide 49 bears downwardly against the outer end of the extension 46. The spring 48 serves to take up any play in the fine adjustment mechanism and, due to the length and position of the extension 46, serves to balance the weight of the body tube and counteract any tendency of the slide 11 to bind or jam in the guideways of the arm 10.

In the modification shown in Fig. 5 the block 50 is made much narrower than the slot in the tube 15 and a member 51 is inserted into the block to bear against the walls 32. The member 51 may be either a plate or a pin or pins.

Another modified form of sliding block is shown in Figs. 6 and 7. The block 52 is provided with a transverse cut 53 and a longitudinal cut 54 extending from the transverse cut 53 to the end of the block. A screw 55 will spread the two sections formed by the cuts to insure a close fit between the walls 32 of the slot in tube 15.

Fig. 8 shows a modified pivot for the lever in which a shaft 56 is substituted for the knife edge 38 and the ring 57 of the lever completely encircles the shaft 56.

In assembling the fine adjustment according to my invention, the parts requiring accurate positioning can be so positioned outside of the microscope arm. The shaft 21 is positioned in the bearing 16 and the block 30 is positioned within the guideways 32 and on the threaded portion 22, and the tube 15 carrying this assembly is then inserted through the aperture 14 into the arm. There is no need for extreme precision in the fitting of the lever 37 or pin 41, all of the precision parts being within the tube 15. Thus it is apparent that the fine adjustment mechanism may be easily and rapidly mounted in the microscope by relatively unskilled workers and yet be smooth and accurate in operation.

From the foregoing it is apparent that I am able to attain the objects of my invention and provide a fine adjustment mechanism for a microscope which is compact and simple of structure yet efficient in operation and can be easily and readily manufactured and assembled. Obviously various modifications can be made without departing from the spirit of my invention.

I claim:

1. In a microscope having an arm and a body tube slidably mounted thereon, means for moving said body tube comprising a hollow member having a longitudinal parallel sided slot, a screw extending longitudinally through said member, a nut threaded on said screw, means cooperating with said slot to prevent rotation of said nut, a lever pivotally mounted in said arm, and means operatively connecting said lever and said body tube, said nut and said lever cooperating, through said slot, to actuate said last-named means to move said body tube.

2. In a microscope having an arm and a body tube slidably mounted thereon, means for moving said body tube comprising a hollow cylinder having a parallel sided longitudinal slot, a screw rotatably mounted in said cylinder and extending longitudinally therethrough, a travelling member threaded on said screw, means cooperating with said slot to prevent rotation of said travelling member, a lever member pivotally mounted in said arm, and means operatively connecting said lever and said body tube, one of said members extending through said slot into contact with the other whereby rotation of said screw will cause pivotal movement of said lever member to actuate said last-named means and move said body tube.

3. In a microscope, a supporting arm, a body tube slidably mounted on said arm, a lever having one arm supporting said body tube, a cylindrical tube extending through said arm and having a longitudinal parallel-sided slot, bearings at each end of said tube, a shaft journalled in said bearings, a nut threaded on said shaft between said bearings, means on said nut cooperating with said slot for preventing rotation of said nut, means on said nut engaging the other arm of said lever, and means for rotating said shaft.

4. In a microscope, a supporting arm, a body tube slidably mounted on said arm, a lever having one arm supporting said body tube, a cylindrical tube extending through said arm and having a longitudinal parallel-sided slot, bearings at each end of said tube, a shaft journalled in said bearings, a nut threaded on said shaft between said bearings, means on said nut cooperating with said slot for preventing rotation of said nut, means on said nut engaging the other arm of said lever, means for rotating said shaft, and cooperating means on said nut and on said shaft for limiting the travelling movement of said nut.

5. In a self-contained fine adjustment mechanism, a tube having a longitudinal, parallel-sided slot, a bearing at each end of said tube, a shaft journalled in said bearings, said shaft being threaded between said bearings, a nut mounted on said shaft between said bearings, a member extending through said nut and having bearing engagement with the sides of said slot to prevent rotation of said nut, and means for rotating said shaft.

6. In a self-contained fine adjustment mechanism, a tube having a longitudinal, parallel-sided slot, a bearing at each end of said tube, a shaft journalled in said bearings, said shaft being threaded between said bearings, a nut mounted on said shaft between said bearings, a member extending through said nut and having bearing engagement with the sides of said slot to prevent rotation of said nut, means for rotating said shaft, and cooperating means on said nut and said shaft for limiting the travelling movement of said nut.

7. In a self-contained fine adjustment mechanism, a tube having a longitudinal parallel-sided slot, a bearing at each end of said tube, a shaft journalled in said bearings, said shaft being threaded between said bearings, a nut mounted on said shaft between said bearings, said nut having a T-shaped slot adjacent one end forming two separable sections, means for separating said sections to insure close engagement between said sections and the sides of said slot, and means for rotating said shaft.

8. In a self-contained fine adjustment mechanism, a tube having a longitudinal parallel-sided slot, a bearing at each end of said tube, a shaft journalled in said bearings, said shaft being threaded between said bearings, a nut mounted on said shaft between said bearings, said nut having a T-shaped slot adjacent one end forming two separable sections, means for separating said sections to insure close engagement between said sections and the sides of said slot, means for rotating said shaft, and means for limiting the longitudinal travel of said nut on said threaded shaft.

HENRY F. KURTZ.